US009819245B2

(12) United States Patent
Chou

(10) Patent No.: US 9,819,245 B2
(45) Date of Patent: Nov. 14, 2017

(54) POWER GENERATION APPARATUS

(71) Applicant: Chung-Ming Chou, Tainan (TW)

(72) Inventor: Chung-Ming Chou, Tainan (TW)

(*) Notice: Subject to any disclaimer, the term of this patent is extended or adjusted under 35 U.S.C. 154(b) by 264 days.

(21) Appl. No.: 14/843,509

(22) Filed: Sep. 2, 2015

(65) Prior Publication Data

US 2016/0111937 A1 Apr. 21, 2016

(30) Foreign Application Priority Data

Oct. 20, 2014 (TW) .............................. 103136210 A

(51) Int. Cl.
H02K 7/18 (2006.01)
F16H 1/28 (2006.01)
F16H 57/04 (2010.01)
B60L 7/12 (2006.01)
H02K 7/116 (2006.01)
B60K 7/00 (2006.01)
B60K 25/08 (2006.01)
H02K 7/102 (2006.01)

(52) U.S. Cl.
CPC ......... *H02K 7/1846* (2013.01); *B60K 7/0007* (2013.01); *B60K 25/08* (2013.01); *B60L 7/12* (2013.01); *F16H 1/28* (2013.01); *F16H 57/0415* (2013.01); *F16H 57/0479* (2013.01); *F16H 57/0486* (2013.01); *H02K 7/102* (2013.01); *H02K 7/116* (2013.01)

(58) Field of Classification Search
CPC .......... H02K 7/102; H02K 7/116; H02K 7/10; H02K 51/00; H02K 7/1846; H02K 21/24

USPC ........ 310/67 A, 76–77, 83, 75 R, 75 B, 75 C
See application file for complete search history.

(56) References Cited

U.S. PATENT DOCUMENTS

2005/0264111 A1* 12/2005 Tanaka ...................... B62J 6/12
310/75 C
2005/0285461 A1* 12/2005 Kitamura ............... B62M 25/08
310/67 A
2006/0082232 A1* 4/2006 Sesselmann .......... F16H 49/001
310/83
2007/0252452 A1* 11/2007 Ishimoto .................... B62J 6/12
310/67 A (Continued)

FOREIGN PATENT DOCUMENTS

| CN | 201656546 U | 11/2010 |
| CN | 102101430 A | 6/2011 |
| CN | 103072493 A | 5/2013 |

*Primary Examiner* — Thanh Lam
(74) *Attorney, Agent, or Firm* — Muncy, Geissler, Olds & Lowe, P.C.

(57) ABSTRACT

A power generation system adopted for use on a vehicle comprises a first rotary member, a second rotary member, a transmission gear set and a brake module. The first rotary member includes a first gear, and a housing space for installation of the second rotary member. The second rotary member includes a second gear with a gear ratio smaller than that of the first gear, an excitation winding and an electric input portion. The transmission gear set includes at least one transmission gear which is driven by the first gear to drive the second gear to rotate in a direction opposite to the first gear. The brake module detects operation condition of a brake pedal and a drive pedal made by the driver, and outputs an excitation current to the electric output portion via a first brush to generate electric power.

10 Claims, 5 Drawing Sheets

(56) References Cited

U.S. PATENT DOCUMENTS

2010/0320879 A1\* 12/2010 Liao ............................ B62J 6/12
                                                             310/67 A
2014/0319948 A1\* 10/2014 Nagase ................... H02K 5/145
                                                             310/83

\* cited by examiner

POWER GENERATION APPARATUS

FIELD OF THE INVENTION

The present invention relates to a power generation system and particularly to a power generation system used on a vehicle to recover driving power during deceleration of the vehicle to generate electricity.

BACKGROUND OF THE INVENTION

With rapid development of hybrid vehicles that combines gasoline and electric power recovering driving power of the vehicles to get steady electric power for electric motors equipped in the vehicles has become a heavy focus in research and development projects among car producers. At present the commonly adopted technique of electric power generation through recovering the driving power mainly focuses on providing a power generator on a vehicle to generate electric power when the vehicle is moving at a speed greater than a preset value to charge a battery set to provide electric power for activation and operation of the electric motors. However, traffic jam in urbane area takes place frequently nowadays, and most vehicles often are in a low speed condition and cannot move at a higher speed to start the power generator to charge the battery. As a result, the battery could not save enough electric power to support operation of the electric motors.

To address this issue, Applicant proposed a technique of recovering driving power during sliding or braking of vehicles that was disclosed in China patent publication Nos. CN103072493A, CN102101430A and China patent No. CN201656546U. While the aforesaid technique can recover driving power to generate electricity during the vehicles in a sliding or braking condition, the vehicles are at a lower speed state, and the rotor in the power generator driven by the wheel axle also is decelerating, hence spinning speed difference between the rotor and a stator of the power generator is not significant. As a result, power generation efficiency of the power generator is lower. It still leaves a lot to be desired in terms of power generation efficacy.

SUMMARY OF THE INVENTION

The primary object of the present invention is to solve the problem of deficient power generation efficacy on the conventional power generator.

To achieve the foregoing object the present invention provides a power generation system adopted for use on a vehicle. The vehicle includes a drive pedal operable by a driver to make a drive member to generate a corresponding rotation speed variation to make the vehicle to move forward at a selected speed and a brake pedal operable by the driver to activate a tire brake to provide a deceleration force on a tire of the vehicle. The power generation system comprises a first rotary member, a second rotary member, a transmission gear set and a brake module. The first rotary member is run through by a wheel axle, and includes a first gear with a first gear ratio, an electromagnetic winding and a housing space corresponding to the wheel axle. The first rotary member is driven by the wheel axle and has a first rotation displacement. The second rotary member is located in the housing space and on the wheel axle coaxial with the first rotary member, and includes a second gear with a second gear ratio, an excitation winding corresponding to the electromagnetic winding and an electric input portion connected to the excitation winding. The second gear ratio is smaller than the first gear ratio. The transmission gear set includes a support rack fixedly connected to the vehicle and at least one transmission gear hinged on the support rack and engaged with the first gear and the second gear. Each transmission gear, during the first rotation displacement, drives the second rotary member in a second rotation displacement opposite in the direction of the first rotation displacement so that the electromagnetic winding and the excitation winding generate movements against each other. The brake module is connected to the brake pedal and the drive pedal, and includes a first brush corresponding to the electric input portion. The brake module detects movement of the brake pedal or movement suspension of the drive pedal made by the driver to output an excitation current via the first brush to the electric input portion so that the excitation winding generates excitation magnetism to form magnetic cutting with the electromagnetic winding to generate electric power.

In one aspect the first rotary member includes an assembly portion run through by the wheel axle to allow the first rotary member to be mounted on the wheel axle.

In another aspect the second rotary member includes at least one first bearing in contact with the wheel axle to allow the second rotary member to form the second rotation displacement against the wheel axle.

In yet another aspect the support rack includes at least one second bearing in contact with the wheel axle so that the wheel axle can rotate against the support rack.

In yet another aspect the first brush of the brake module is wedged in the support rack.

In yet another aspect the brake module includes a solenoid valve which can be controlled to make the first brush in contact with the electric input portion.

In yet another aspect the brake module further includes a speed detection unit to detect spinning speed of the tire to determine output of the excitation current.

In yet another aspect each tire of the vehicle is equipped with the first rotary member, the second rotary member and the transmission gear set, and the brake module includes a timing control module connected to each second rotary member to determine output of the excitation current through a time sequence.

In yet another aspect the first rotary member includes a plurality of air channeling trenches faced the surface of a wheel frame to provide cooling airflow during the first rotation displacement, and a cooling passage to provide the cooling airflow during the first rotation displacement to enter the second rotary member to disperse heat thereof.

In yet another aspect the first rotary member includes an electric output portion connected to the electromagnetic winding and in contact with a second brush of the brake module to channel electric power being generated from the power generation system.

The invention, through the structure set forth above, compared with the conventional techniques, can provide many advantageous features, notably:

1. By driving the second rotary member through the first rotary member and the transmission gear set, and with the first gear ratio of the first gear greater than the second gear ratio of the second gear, and the gear ratio difference between the first gear and the second gear, the second rotary member can spin significantly faster than the first rotary member, therefore the power generation system of the invention can be used on the vehicle at lower speed conditions.

2. Through the detection module output amount of the excitation current can be controlled based on the vehicle speed to change magnetic resistance during spinning of the power generation apparatus, therefore provide different brake power to enhance driving comfort.

3. The invention can generate electric power at low speed driving of the vehicle, hence can recover driving power of the vehicle during deceleration.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
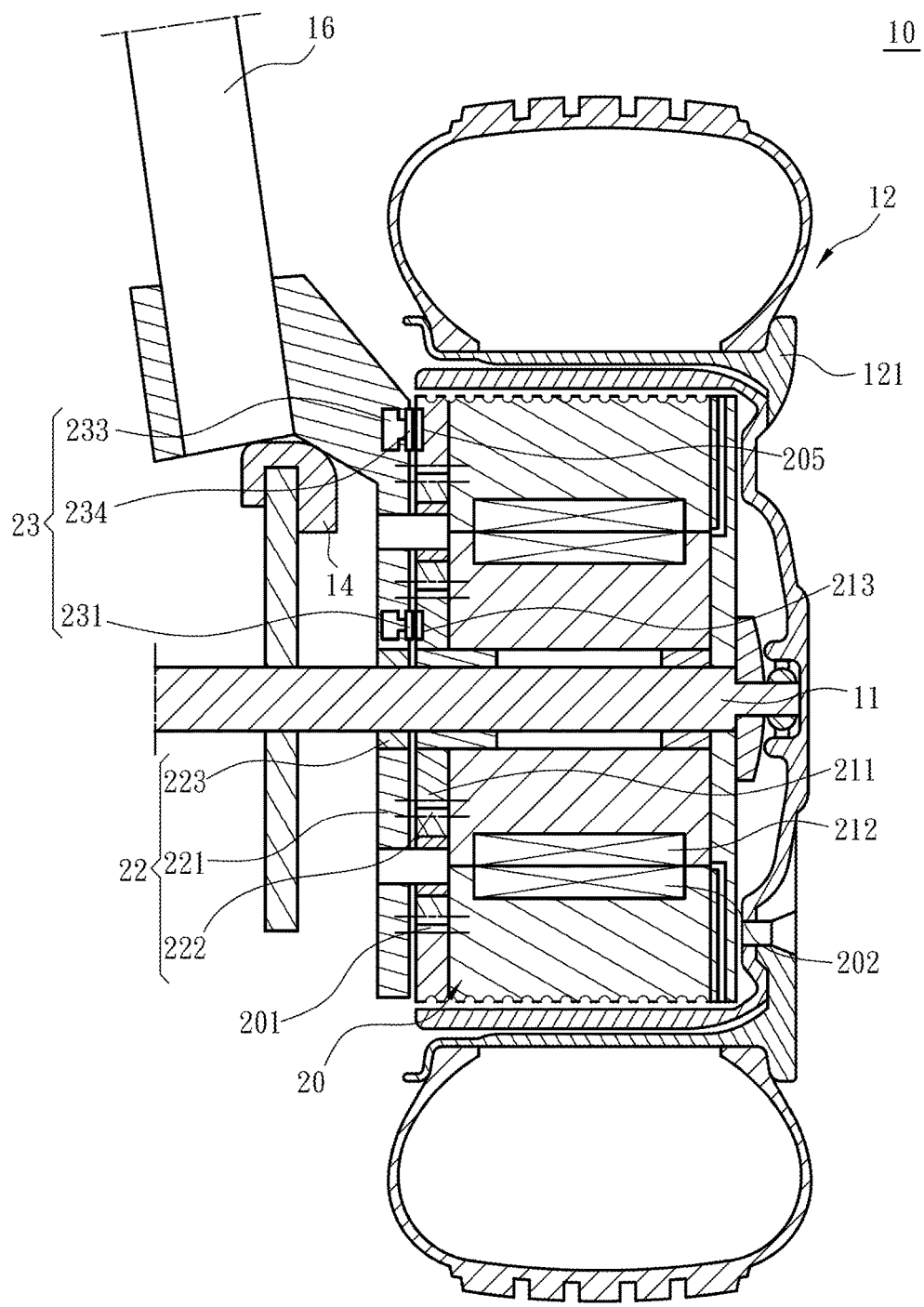
FIG. 1 is a structural schematic view of an embodiment of the invention.

Please referring to FIGS. 1 through 5, the present invention aims to provide a power generation system used on a vehicle 10 which includes a drive member (not shown in the drawings), a wheel axle 11 to transmit driving power generated by the drive member, one set of tires 12 mounted onto the wheel axle 11 to receive transmission of the wheel axle 11 to generate rotation, a drive pedal 13 operable by a driver to make the drive member to generate corresponding rotation changes to make the vehicle 10 to move at desired speeds, and a brake pedal 15 operable by the driver to activate a tire brake 14 to provide a deceleration action force to the tire 12. The drive member mentioned above can be an engine or a motor. The power generation system of the invention comprises a first rotary member 20, a second rotary member 21, a transmission gear set 22 and a brake module 23. The first rotary member 20 is run through by the wheel axle 11 and includes a first gear 201, an electromagnetic winding 202 and a housing space 203 corresponding to the wheel axle 11. More specifically, the first rotary member 20 can be made in a shape based on a wheel frame 121 of each tire 12. The first gear 201 can be positioned at one side of the first rotary member 20 facing a vehicle shock absorber 16, and has a first gear ratio. The first rotary member 20 can further be made by stacking a plurality of silicon steel sheets with a conductive wire wound thereon for a selected number of coils to form the electromagnetic winding 202. In addition, the first rotary member 20 can further include an assembly portion 204 run through by the wheel axle 11 for fastening the first rotary member 20 to the wheel axle 11, thereby driven by the wheel axle 11 to generate a first rotation displacement. Hence the rotation speed of the first rotation displacement is controlled by the spinning speed of the wheel axle 11. Furthermore, the first rotary member 20 can also be formed by coupling a plurality of mechanical structures by taking into account of fabrication factors to allow it to be run through by the wheel axle 11. This embodiment is having the first rotary member 20 run through by the wheel axle 11 and held in the tire 12 as an example. The second rotary member 21 is located in the housing space 203 of the first rotary member 20 and mounted onto the wheel axle 11 coaxial with the first rotary member 20. The second rotary member 21 can be formed in a profile according to the housing space 203, and includes a second gear 211, an excitation winding 212 corresponding to the electromagnetic winding 202 and an electric input portion 213 connected to the excitation winding 212. More specifically, the second gear 211 also is located at one side of the second rotary member 21 facing of the vehicle shock absorber 16 and has a second gear ratio smaller than the first gear ratio. The second rotary member 21 also can be formed by stacking a plurality of silicon sheets with another conductive wire wound thereon for another selected number of coils to form the excitation winding 212. The excitation winding 212 is corresponding to the electromagnetic winding 202 in positioning such that when the first rotary member 20 rotates against the second rotary member 21 magnetic line cutting is generated. In one embodiment the electric input portion 213 can be an electrode connected to the excitation winding 212 to transmit an excitation current to make the excitation winding 212 to generate magnetic forces.

The transmission gear set 22 includes a support rack 221 fixedly connected to the vehicle 10 and at least one transmission gear 222 hinged on the support rack 221 to engage with the first gear 201 and the second gear 211. More specifically, the support rack 221 can be positioned close to the vehicle shock absorber 16. In one embodiment each transmission gear 222 can have a gear ratio between the first gear ratio and the second gear ratio. Hence with each transmission gear 222 engaged with the first gear 201 and the second gear 211 a planetary gear transmission structure is formed. When the first gear 201 drives each transmission gear 222 to rotate in the first rotation displacement the transmission gear 222 drives the second gear 211 to generate the second rotation displacement in a direction opposite to the first rotation displacement so that the second rotary member 21 revolves against the first rotary member 20 to make the electromagnetic winding 202 and the excitation winding 212 to generate relative movements against each other. Because the gear ratios of the first gear 201, the second gear 211 and the transmission gear 222 are different, and the second gear 211 with the second gear ratio rotates faster than the first gear 201, a speed difference is formed between the first rotary member 20 and the second rotary member 21, thereby the relative movement between the electromagnetic winding 202 and the excitation winding 212 is more significant and magnetic line cutting generated between them also is significant. In addition, in order to make the second rotary member 21 to generate the second rotation displacement against the wheel axle 11 it can further include at least one first bearing 214 to form contact between them. Moreover, the support rack 221 also can include at least one second bearing 223 in contact with the wheel axle 11 to generate rotation against the support rack 221.

The brake module 23 is connected to the drive pedal 13 and the brake pedal 15, and includes a first brush 231 corresponding to the electric input portion 213. More specifically, the brake module 23 can include a detection module 232 to detect movement status of the brake pedal 15 and the drive pedal 13 to detect driving operation of the driver. When the brake pedal 15 is stepped by the driver the first brush 231 outputs the excitation current to the electric input portion 213 to generate magnetic cutting between the excitation winding 212 and the electromagnetic winding 202 to generate electric energy. Or the brake module 23 detects through the detection module 232 that the drive pedal 13 is moved by the driver and paused for a certain duration before the drive pedal 13 is moved again, then judges that the vehicle is sliding and the excitation current is output to the electric input portion 213 via the first brush 231 to generate electric power. Moreover, the brake module 23 can further adjust the output amount of the excitation current based on operation conditions of the brake pedal 15 and the drive pedal 13 operated by the driver. For instance, when the driver heavily steps the brake pedal 15 the detection module 232 generates a detection signal at a greater current so that the brake module 23 outputs a greater amount of excitation current to make the excitation winding 212 to generate electric power. Or, when the drive pedal 13 is moved by the driver, then pauses for a selected duration, the excitation current sent to the excitation winding 212 increases gradually. Furthermore, in one embodiment the first brush 231 of the brake module 23 is wedged in the surface of the support rack 221 in contact with the electric input portion 213 of the second rotary member 21. In addition, the first brush 231 is not in contact with the electric input portion 213 in normal conditions. The brake module 23 includes a solenoid valve 233 which is controlled to make the first brush 231 in contact with the electric input portion 213. The solenoid valve 233 is controlled by the detection module 232 to move the first brush 231 to the electric input portion 213 to form contact between them.

Figure 5:
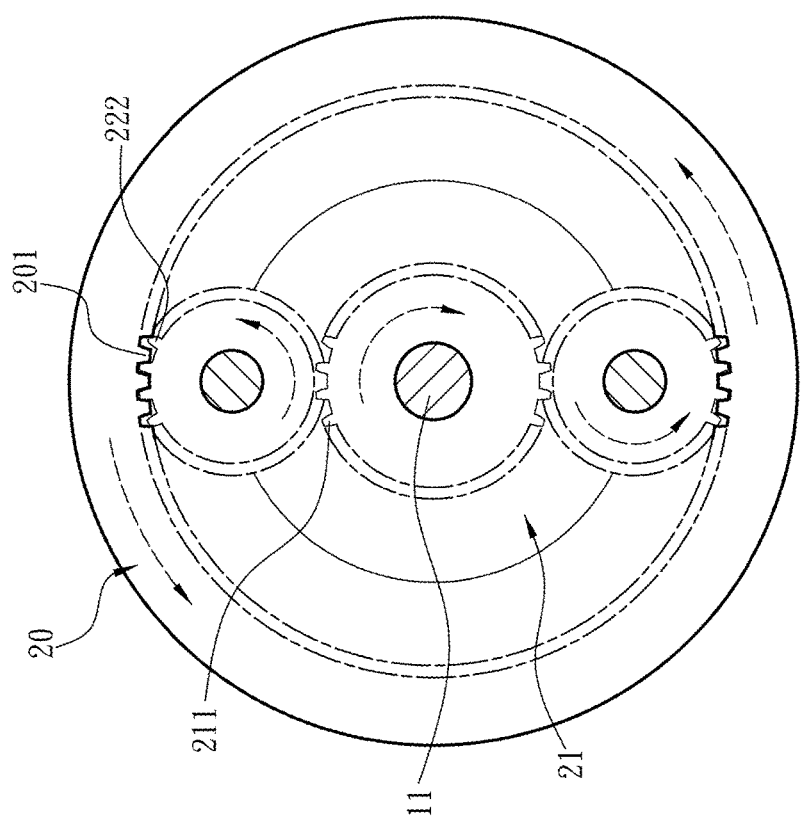
FIG. 5 is a schematic view of an embodiment of the invention showing engagement and transmission relationships among the first gear, the second gear and the transmission gear.

Please referring to FIG. 5, when the power generation system of the invention is in use while the vehicle 10 is moving at a driving speed, although the first rotary member 20 and the second rotary member 21 generate respectively the first rotation displacement and the second rotation displacement the excitation winding 212 does not get the excitation current, hence does not generate magnetic line cutting with the electromagnetic winding 202, namely, no electric power is generated while the vehicle 10 is in normal moving condition. However, when the brake pedal 15 is stepped by the driver or the drive pedal 13 is stopped being operated by the driver and the vehicle 10 decelerates the driving speed, the brake module 23 outputs the excitation current to the second rotary member 21 through the first brush 231 so that magnetic line cutting is formed between the excitation winding 212 and the electromagnetic winding 202 and electric power is generated. In addition, the first rotary member 20 can further include an electric output portion 205 connected to the electromagnetic winding 202 to receive the electric power generated by the action of the electromagnetic winding 202 and the excitation winding 212. In addition, the brake module 23 can further include a second brush 234 in contact with the electric output portion 205 that is implemented same as the first brush 231, details are omitted herein. The second brush 234 receives electric power from the electric output portion 205 and can save it in a charge battery (not shown in the drawings) of the vehicle 10. Moreover, with magnetic resistance generated between the excitation winding 212 and the electromagnetic winding 202 another brake action force can be generated for the vehicle 10 to significantly slow the moving speed of the vehicle 10.

Figure 4:
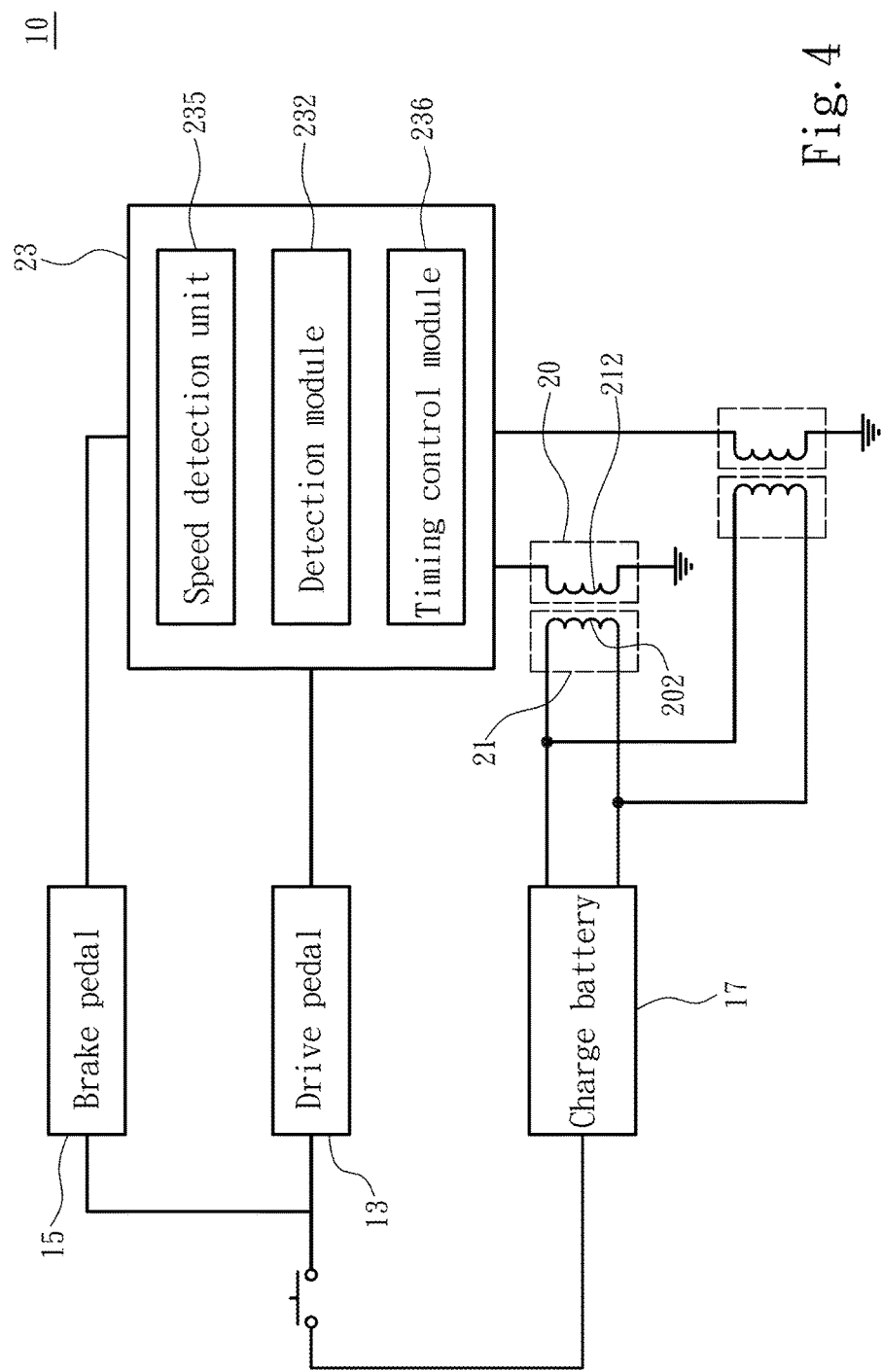
FIG. 4 is a unit block diagram of an embodiment of the invention.

Please also referring to FIG. 4, in another embodiment the brake module 23 can further include a speed detection unit 235 to detect the spinning speed of the tire 12 to determine output of the excitation current. The speed detection unit 235 can detect whether the spinning speed of the tire 12 exceeds a vehicle speed limit, then determine output of the excitation current. The speed detection unit 235 can be set to stop the excitation current when the spinning speed of the tire 12 is lower than the speed limit of the vehicle 10. The vehicle speed limit of the vehicle 10 also can be a vehicle moving speed lower than another set value (such as 10 km per hour) of a corresponding spinning speed generated by the tire 12. Thus, when the vehicle 10 moves at a speed lower than a certain speed operation of the power generation system is suspended. In addition, the vehicle 10 includes a plurality of the tires 12 each can be equipped with the first rotary member 20, the second rotary member 21 and the transmission gear set 22. The brake module 23 can further include a timing control module 236 connected to each second rotary member 21 to determine output of the excitation current according to a time sequence, thereby control power generation condition of each tire 12.

Figure 2:
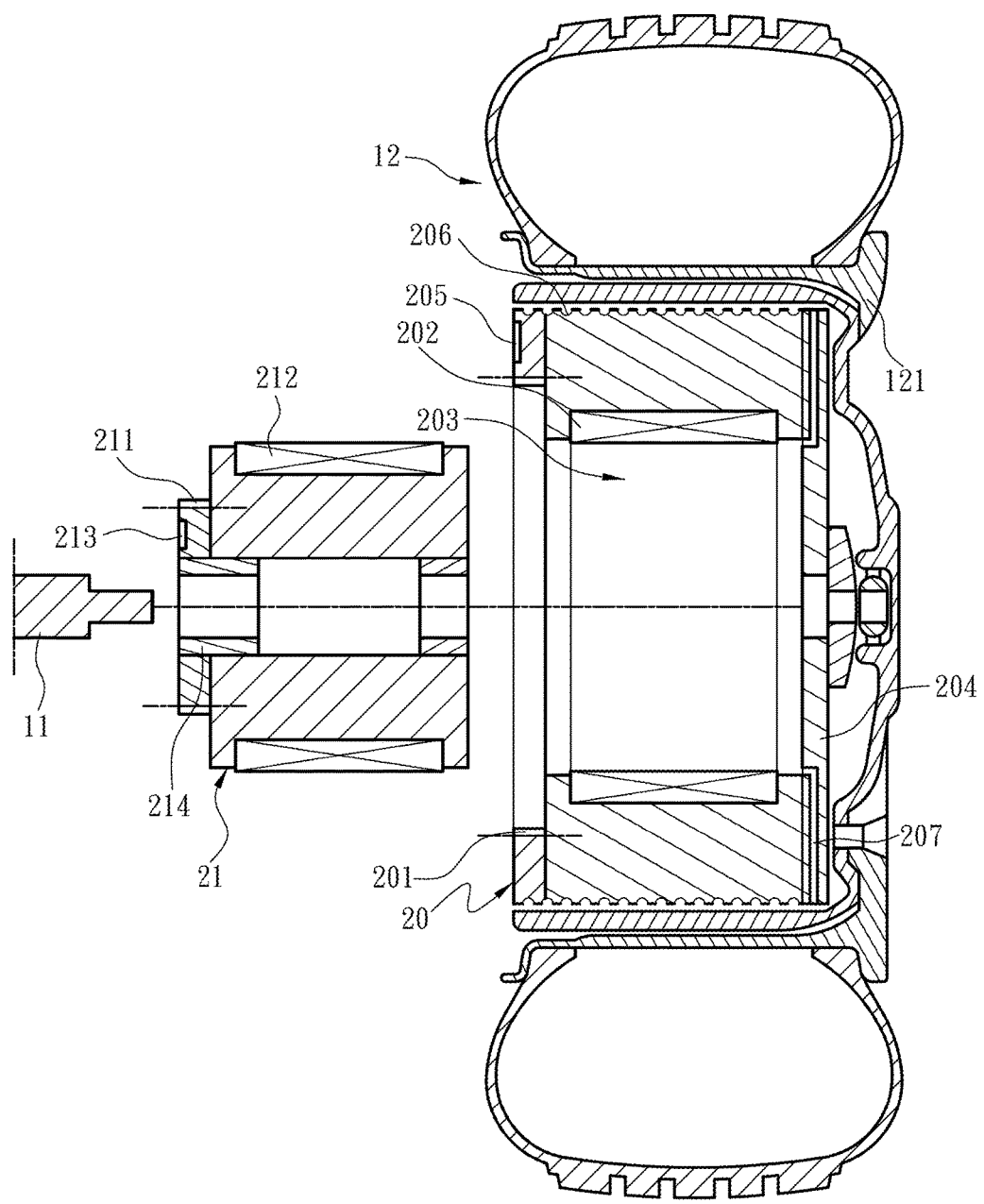
FIG. 2 is an exploded view of an embodiment of the invention.
Figure 3:
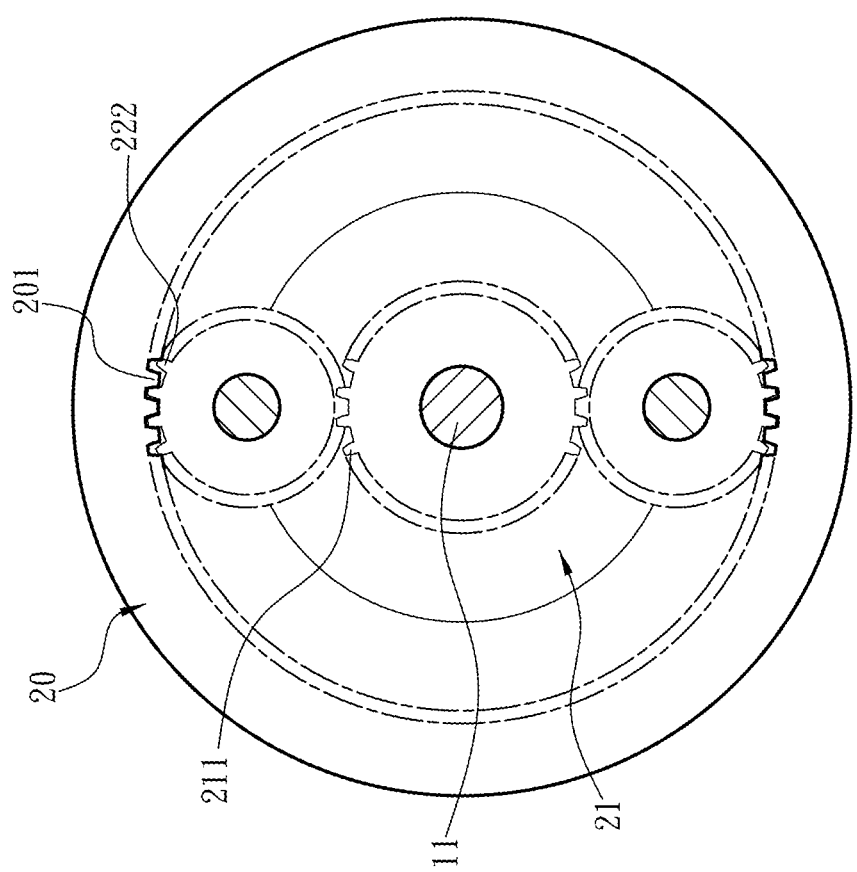
FIG. 3 is a schematic view of an embodiment of the invention showing engagement relationships among the first gear, the second gear and the transmission gear.

Please referring to FIGS. 1 and 2, in yet another embodiment the first rotary member 20 includes a plurality of air channeling trenches 206 facing a surface of the wheel frame 121 to provide cooling airflow during the first rotation displacement. The air channeling trenches 206 can be formed on the surface of the first rotary member 20 in an inclined manner. Their number and profiles can be adjusted according to different designs. In addition, the first rotary member 20 can also include a cooling passage 207 to allow the cooling airflow to enter the second rotary member 21 during the first rotation displacement. Through the air channeling trenches 206 and the cooling passage 207 cooling can be provided to the first rotary member 20 and the second rotary member 21.

As a conclusion, the power generation system of the invention can detect operation conditions of the brake pedal and the drive pedal operated by the driver. When the brake pedal is operated or the drive pedal is paused in operation by the driver, the second rotary member provides the excitation current so that the excitation winding on the second rotary member and the electromagnetic winding generate magnetic line cutting. Moreover, because the first gear ratio of the first gear is greater than the second gear ratio of the second gear, the second rotary member can rotate at a speed faster than the first rotary member so that the magnetic line cutting between the excitation winding and the electromagnetic winding is more significant to generate electric power. As a result, because of different gear ratios of the first gear and the second gear the vehicle can generate electric power at lower moving speeds to recover the driving power during the deceleration and brake process.

What is claimed is:

1. A power generation system used on a vehicle which includes a drive pedal operable by a driver to make a drive member to generate corresponding rotation speed change so that the vehicle is moving at a forward speed and a brake pedal operable by the driver to activate a tire brake to provide a deceleration force to a tire of the vehicle, comprising:

a first rotary member which is run through by a wheel axle and includes a first gear with a first gear ratio, an electromagnetic winding and a housing space corresponding to the wheel axle, and is driven by spinning of the wheel axle to form a first rotation displacement;

a second rotary member which is located in the housing space and on the wheel axle coaxial with the first rotary member, and includes a second gear with a second gear ratio, an excitation winding corresponding to the electromagnetic winding and an electric input portion connected to the excitation winding, the second gear ratio being smaller than the first gear ratio;

a transmission gear set which includes a support rack fixedly located on the vehicle and at least one transmission gear hinged on the support rack to engage with the first gear and the second gear; each transmission gear driving the second rotary member during the first rotation displacement to generate a second rotation displacement in a direction opposite to the first rotation displacement so that the electromagnetic winding and the excitation winding generate opposite movements; and a brake module which is connected to the brake pedal and the drive pedal and includes a first brush corresponding to the electric input portion, and detects operation of the brake pedal by the driver or operation suspension of the drive pedal by the driver so that an excitation current is output through the first brush to the electric input portion to make the excitation winding to generate excitation to produce magnetic cutting with the electromagnetic winding to generate electric power.

2. The power generation system of claim 1, wherein the first rotary member includes an assembly portion run through by the wheel axle to fasten the first rotary member to the wheel axle.

3. The power generation system of claim 2, wherein the second rotary member includes at least one first bearing in contact with the wheel axle to allow the second rotary member to proceed the second rotation displacement against the wheel axle.

4. The power generation system of claim 2, wherein the support rack includes at least one second bearing in contact with the wheel axle so that the wheel axle can spin against the support rack.

5. The power generation system of claim 1, wherein the first brush of the brake module is located on the support rack.

6. The power generation system of claim 1, wherein the brake module includes a solenoid valve controlled to make the first brush in contact with the electric input portion.

7. The power generation system of claim 1, wherein the brake module further includes a speed detection unit to detect spinning speed of the tire to determine output of the excitation current.

8. The power generation system of claim 1, wherein each tire of the vehicle is equipped with the first rotary member, the second rotary member and the transmission gear set, the brake module including a timing control module connected to each second rotary member to determine output of the excitation current according to a time sequence.

9. The power generation system of claim 8, wherein the first rotary member includes a plurality of air channeling trenches facing a surface of a wheel frame to provide cooling airflow during the first rotation displacement, and a cooling passage to allow the cooling airflow to enter the second rotary member during the first rotation displacement to perform cooling.

10. The power generation system of claim 1, wherein the first rotary member includes an electric output portion connected to the electromagnetic winding and in contact with a second brush of the brake module to channel the generated electric power outside the power generation system.

\* \* \* \* \*